(12) United States Patent
Musick

(10) Patent No.: US 10,978,730 B2
(45) Date of Patent: Apr. 13, 2021

(54) IONIZED GAS METAL CORE BATTERY

(71) Applicant: Mathew Steven Musick, Whitehall, MI (US)

(72) Inventor: Mathew Steven Musick, Whitehall, MI (US)

(73) Assignee: Hands of Jesus, Inc., Whitehall, MI (US)

( * ) Notice: Subject to any disclaimer, the term of this patent is extended or adjusted under 35 U.S.C. 154(b) by 225 days.

(21) Appl. No.: 16/233,679

(22) Filed: Dec. 27, 2018

(65) Prior Publication Data
US 2019/0140303 A1    May 9, 2019

Related U.S. Application Data

(63) Continuation-in-part of application No. 15/341,169, filed on Nov. 2, 2016, now Pat. No. 10,396,391.

(60) Provisional application No. 62/277,223, filed on Jan. 11, 2016.

(51) Int. Cl.
| | | |
|---|---|---|
| *H01M 10/02* | (2006.01) | |
| *H01M 10/613* | (2014.01) | |
| *H01M 10/34* | (2006.01) | |
| *H01M 10/63* | (2014.01) | |
| *H01M 10/48* | (2006.01) | |
| *H01M 10/615* | (2014.01) | |
| *H01M 10/36* | (2010.01) | |
| *H01M 10/42* | (2006.01) | |

(52) U.S. Cl.
CPC ......... *H01M 10/02* (2013.01); *H01M 10/345* (2013.01); *H01M 10/36* (2013.01); *H01M 10/42* (2013.01); *H01M 10/48* (2013.01); *H01M 10/613* (2015.04); *H01M 10/615* (2015.04); *H01M 10/63* (2015.04)

(58) Field of Classification Search
CPC .. H01M 10/02; H01M 10/613; H01M 10/615; H01M 10/63; H01M 10/48; H01M 10/34; H01M 10/345

See application file for complete search history.

(56) References Cited

U.S. PATENT DOCUMENTS

2016/0308237 A1* 10/2016 Albertus ................ H01M 8/20

* cited by examiner

*Primary Examiner* — Karie O'Neill Apicella
(74) *Attorney, Agent, or Firm* — Dunlap Bennett & Ludwig, PLLC

(57) ABSTRACT

A battery is provided. The battery includes a pressurized gas circulating system and a reaction chamber. The reaction chamber includes a housing and a metal core disposed within the housing. The pressurized gas circulating system at least includes a high pressure storage tank. A delivery line fluidly connects the high pressure storage tank to the housing. An exhaust line fluidly connects the housing to the pressurized gas circulating system. The battery further includes a cathode terminal and an anode terminal.

18 Claims, 2 Drawing Sheets

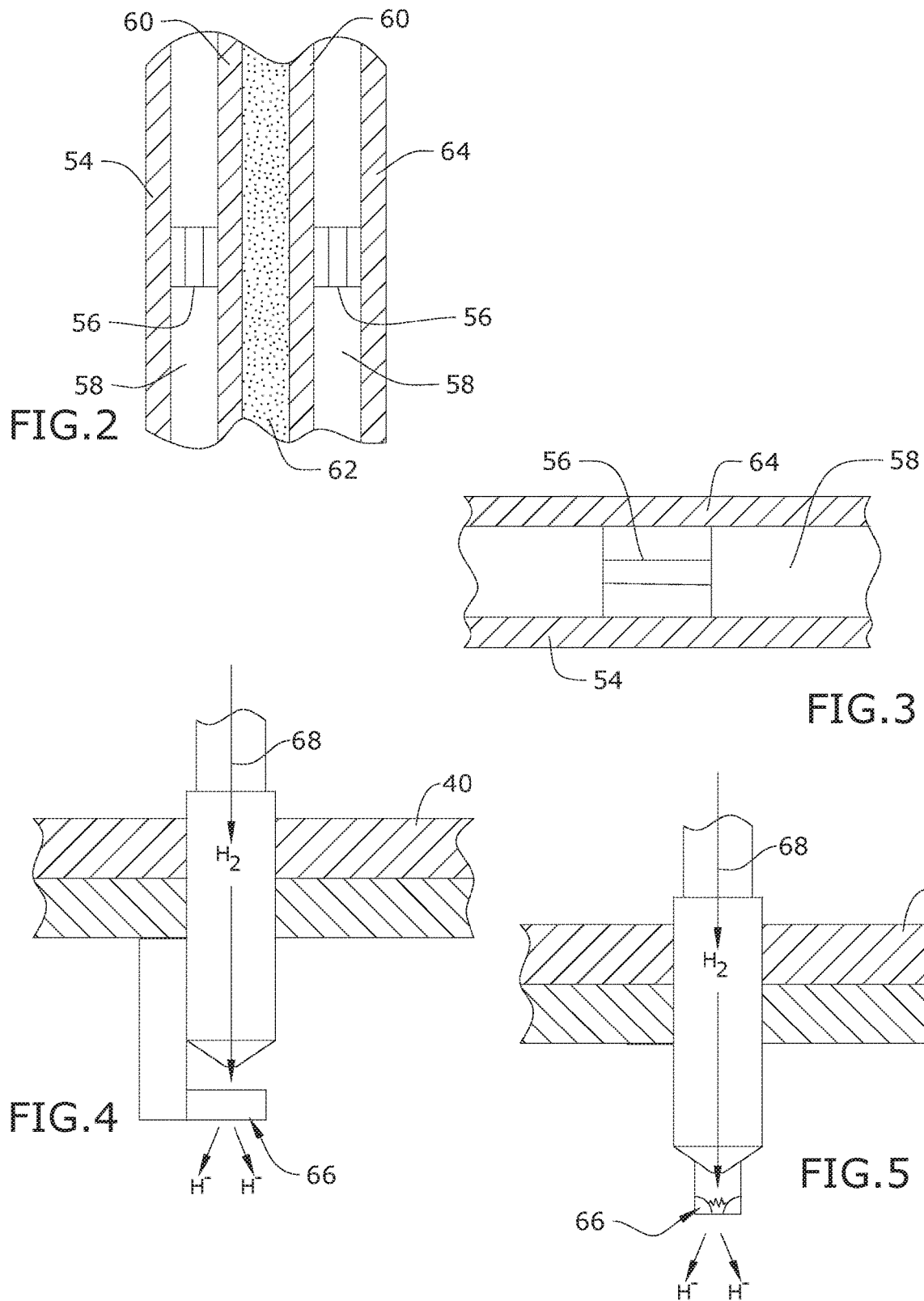

IONIZED GAS METAL CORE BATTERY

CROSS-REFERENCE TO RELATED APPLICATION

This application is a continuation in part of U.S. nonprovisional application Ser. No. 15/341,169, filed Nov. 2, 2016, which claims the benefit of priority of U.S. provisional application No. 62/277,223, filed Jan. 11, 2016, the contents of which are herein incorporated by reference.

BACKGROUND OF THE INVENTION

The present invention relates to a battery which uses ionized gas in reaction with a metal core to store energy.

Lithium batteries are batteries that have lithium as an anode. They stand apart from other batteries in their high charge density (long life) and high cost per unit. Depending on the design and chemical compounds used, lithium cells can produce voltages from 1.5 V (comparable to a zinc-carbon or alkaline battery) to about 3.7 V. Disposable lithium batteries are contrasted with lithium-ion and lithium metal polymer, which are rechargeable batteries, where ions move between the anode and the cathode, using an intercalated lithium compound or metallic lithium as the electrode material. Lithium batteries are widely used in products such as portable consumer electronic devices.

Lithium batteries are limited in their storage capacity, since, by its very nature, lithium can only accept one electron per cation. Modern electric cars, for example, have a range of approximately 300 miles at best, so they require frequent and lengthy recharge sessions.

As can be seen, there is a need for improved batteries that have an increased storage capacity.

SUMMARY OF THE INVENTION

In one aspect of the present invention, a battery comprises: a pressurized gas (which may become a liquid at low temperature or high pressure) circulating system comprising at least a high pressure storage tank; a reaction chamber comprising a housing and a positively charged metal core disposed within the housing, wherein the metal core comprises an oxidation state of at least +3; a delivery line fluidly connecting the high pressure storage tank to the housing; an exhaust line fluidly connecting the housing to the pressurized gas circulating system; a cathode terminal; and an anode terminal connected to the positively charged metal core, wherein the battery comprises a charging phase when connected to a power source and a discharging phase when connected to an external circuit, the charging phase comprising a gas flowing from the high pressure storage tank through the delivery line, wherein the gas is ionized by the cathode terminal with electrons and the ionized gas comes into contact with the metal core, and the discharging phase comprising the anode terminal delivering the electrons to the external circuit and the gas flowing from the housing into the exhaust line.

These and other features, aspects, and advantages of the present invention will become better understood with reference to the following drawings, description, and claims.

BRIEF DESCRIPTION OF THE DRAWINGS

FIG. 2 is a section view of a tank wall of an embodiment of the present invention;

FIG. 3 is a section view of a gas line wall of an embodiment of the present invention;

FIG. 4 is a side detail view of a cathode terminal of an embodiment of the present invention; and FIG. 5 is a front detail view of a cathode terminal of an embodiment of the present invention.

DETAILED DESCRIPTION OF THE INVENTION

Figure 1:
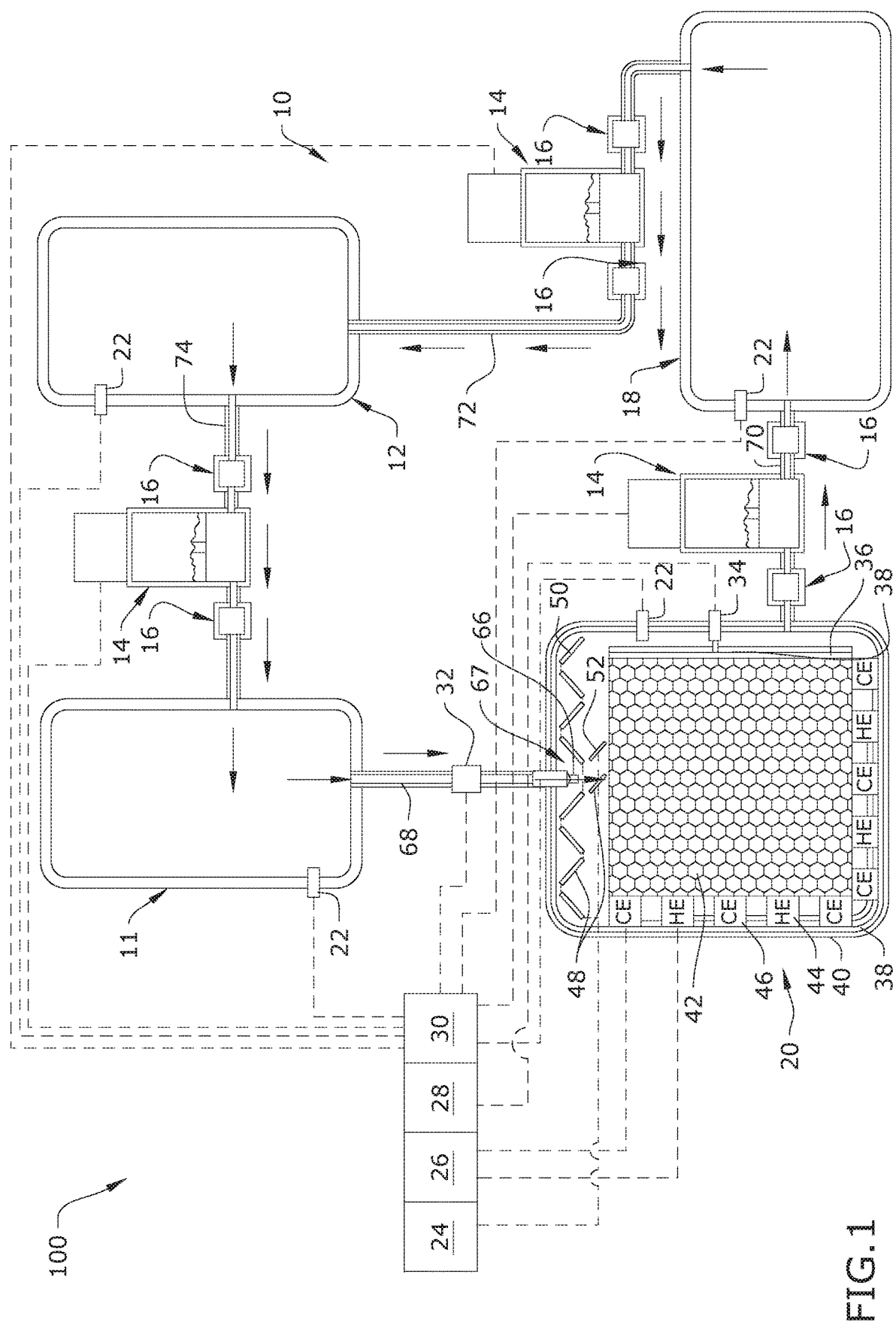
FIG. 1 is a schematic view of an embodiment of the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

The present invention includes a battery which uses ionized gas in reaction with a metal core to store energy. The present invention solves the problem of the limited energy storage capacity of lithium ion batteries, specifically with regard to electric cars or other high capacity applications. In the charging phase, a gas is ionized with a negative charge and made to come into contact with a positively charged metal core. In the discharge phase, a circuit which connects to the metal core is completed to allow the high electrical potential to be released at a specified rate.

One potential metal for use in the core can accept up to nine anions (negatively charged ion) per cation (positively charged ion). Consider the equation $G=-nFE$, where G is the free-energy change in Joules, n is the number of moles of electrons transferred, F is the Faraday constant of 96,485 coulombs per mole of electrons, and E is the cell potential of the battery in volts. Lithium has an "n" value of 1. This new design would have an "n" value of up to 9.

Referring to FIGS. 1 and 5, the present invention includes a battery 100. The battery 100 includes a pressurized gas circulating system 10 and a reaction chamber 20. The reaction chamber 20 includes a housing 40 and a metal core 42 disposed within the housing 40. The pressurized gas circulating system 10 at least includes a high pressure storage tank 11. A delivery line 68 fluidly connects the high pressure storage tank 11 to the housing 40. An exhaust line 70 fluidly connects the housing 40 to the pressurized gas circulating system 10. The battery 100 further includes a cathode terminal 67 and an anode terminal 34.

The battery 100 includes a charging phase when connected to an outside power source and a discharging phase when connected to an external circuit. The charging phase includes a gas flowing from the high pressure storage tank 11 through the delivery line 68. The gas is ionized at the cathode terminal 67 with electrons, and the ionized gas reacts with the metal core 42. The discharging phase includes the anode terminal 34 delivering the electrons to the external circuit and the gas flowing from the housing 40 into the exhaust line 70.

The gas used in the battery 100 may include hydrogen which may become a liquid at very low temperature or high pressure. Alternatively, the gas may be a halogen, such as fluorine or chlorine and may be used to produce a metal halide at the core to store energy. The gas is stored in the high-pressure tank 11 at high pressure and, during the charging phase, is released from the tank 11 through a first valve 32, such as an electronically controlled pressure valve, coupled to the delivery line 68. The gas then passes across or through the cathode terminal 67. The cathode terminal 67 may include two gapped posts 66 that pass a bare stream of electrons between them or one or more energized reflectors 48. If reflectors 48 are used, one or more primary reflectors 52 may be positioned immediately in the path of the gas exiting the first valve 32 while secondary reflectors 50 may be organized in a plane parallel to the appropriate face of the metal core 42 with each individual reflector 50 positioned at an angle to direct free gas molecules toward the metal core 42. The gapped terminal posts 66 and reflectors 48 may be used together in the same design.

In certain embodiments, the cathode terminal 67 is connected to an external circuit or source of electricity via a cathode control module 24. The cathode control module 24 may complete the circuit during the charge phase and moderate a flow of electricity to the gapped posts 66 and reflectors 48. The cathode terminal 67 ionizes the gas molecules to an anion state. The ionized gas is then directed towards the metal core 42, and the anions bond to the positively charged metal core 42.

The metal core 42 of the present invention has an oxidation state of at least +3 and up to an oxidation state of +9, such as an oxidation state of +5 up to an oxidation state of +7. The metal core 42 may be made of, but is not limited to, technetium or rhenium. The metal core 42 may be in the shape of a cube and may have an orderly series of holes at all three geometric axes (x, y, and z). These holes, which may extend the entire length, width, and height of the core, may expose more surface area to the aforementioned ionized gas. The metal core 42 may also be connected or otherwise exposed to one or more temperature control elements, such as cooling elements 46 and heating elements 44. The temperature elements may facilitate the formation (by cooling of the metal core 42) and decomposition (by heating of the metal core 42) of the gas plus metal compound. The cooling and heating action may be controlled by a temperature control module 26. The metal core 42 and heating/cooling elements 44, 46 may all be contained in the housing 40 of the reaction chamber 20. The housing 40 may include an insulating layer 38 to prevent reaction with the gas. If a radioactive metal is used in the metal core 42, the housing 40 may also contain a shielding layer formed of lead. Any appropriate material may be used for the housing 40 of the reaction chamber 20.

The metal core 42 may be connected to an insulated anode terminal 34 which leads out of the reaction chamber 20 and is governed by an anode control module 28. Any face of the metal core 42 which is directly connected to an anode terminal 34 may be enhanced with an appropriate material to increase electrical contact and conductivity. The anode enhancement layer 36 may be comprised of but is not limited to silver or copper. An insulating layer 38 may be used to protect the anode enhancement layer 36 from interaction with the gas. When the anode control module 28 completes the circuit during the discharge phase, the core's 42 electrical potential may be released at a specified rate to an external circuit to provide power.

In certain embodiments, the pressurized gas delivery system 10 may further include a first storage tank 18 fluidly connected to the reaction chamber 20 by the exhaust line 70 and a second storage tank 12 fluidly connected to the first storage tank 18 by a first auxiliary line 72 and fluidly connected to the high pressure storage tank 11 by a second auxiliary line 74. Each of the exhaust line 70, the first auxiliary line 72, and the second auxiliary line 74 may include a pump 14 and a pair of single direction pressure valves 16 on both sides of each pump 14. In such embodiments, the gas may be drawn out of the reaction chamber 20 through a pressure valve 16 coupled to the exhaust line 70 via a pump 14. The gas may flow through another directional pressure valve 16 on the opposite side of the pump 14 and be directed into the first storage tank 18. The present invention may include any number of intermediate storage tanks 12, 18 and series of valves 16 and pumps 14 as needed in order to increase the gas pressure to achieve the desired final gas pressure in the high pressure storage tank 11. Pressure sensors 22 may be added to any storage tank 11, 12, 18 and the reaction chamber 20 to detect changes in gas pressure. These sensors 22 may then provide readings to a pressure control module 30 which may be used to activate the pumps 14 to moderate pressure and to ensure that gas pressure is progressively increased from tank to tank to achieve the desired final pressure within the high pressure storage tank 11.

Wall construction of storage tanks 11, 12, 18, the housing 40, pumps 14, directional pressure valves 16, and the lines 68, 70, 72, 74 may include any or all of the following: a solid inner wall 54, vented reinforcement(s) 56 which may be thermally non-conductive, partial or total vacuum layer(s) 58, solid intermediate wall(s) 60, refrigerant layer(s) 62 which may include but is not limited to liquid nitrogen or solid carbon dioxide, and a solid outer wall 64. Alternatively, the pumps 14 and directional pressure valves 16 may be constructed from, or all surfaces of their interior working chambers which make contact with the gas being stored in the tanks 11, 12, 18 may be lined, coated, or otherwise insulated with, a thermally non-conductive material.

During the charging phase, the cathode control module 24 may complete the circuit, moderating a flow of electricity to the cathode terminal 67 and/or reflectors 48 from the external source or circuit. At this time, the temperature control module 26 may initiate cooling of the metal core 42 via the cooling elements 46. The temperature control module 26 may draw energy initially via the cathode control module 24 from the external circuit or source to power the action of the cooling elements 46. Also at this time, the pressure control module 30 may open the electronically controlled pressure valve 32 to a predetermined or variable setting, permitting gas flow into the reaction chamber 20. The pressure control module 30 may also monitor the chamber 20 and tank 11, 12, 18 pressures and maintain safe and efficient pressure ranges throughout. When the charge phase is completed or otherwise ended, certain functions may be discontinued. The cathode control module 24 may open the circuit, thereby terminating the supply of electricity from the external source to the cathode mechanisms. The pressure control module 30 may close the electronically controlled pressure valve 32 but may continue to monitor system pressures throughout. The temperature control module 26 may sustain an appropriately cool temperature at the metal core 42 to maintain the metal plus gas compounds by drawing energy from the anode terminal 34 via the anode control module 28.

During the discharge phase, the temperature control module 26 may initiate heating of the metal core 42 via the heating elements 44 by drawing energy from the anode terminal 34 through the anode control module 28. At this time, the anode control module 28 may complete the connection to an external circuit and moderate a flow of electricity out of the battery 100 to produce power. Gas that is released by the decomposition of the metal plus gas compound at the metal core 42 is contained initially in the reaction chamber 20. The pressure control module 30 may monitor the pressure via a pressure sensor 22 and when it exceeds a predetermined limit or variable pressure range, the pressure control module 30 may activate a pump 14 to transfer gas from the reaction chamber 20 to the first storage tank 18. In doing so, the gas may also pass through one or more directional pressure valves 16 which prevent the gas from flowing in more than one direction. When tank pressure in the first storage tank 18 exceeds a predetermined limit or variable range, the pressure control module 30 may activate a second pump 14 to transfer gas from the first storage tank 18 to a second storage tank 12. When tank pressure in the second storage tank 12 exceeds a predetermined limit or variable range, the pressure control module 30 may activate a third pump 14 to transfer gas from the second storage tank 12 to either an additional intermediate storage tank if used or to the high pressure storage tank 11. Intermediate storage tanks with the appropriate pumps and directional pressure valves may be added as needed to step up gas pressure to achieve the desired final tank pressure. When the discharge phase is completed or otherwise ended, certain functions may be discontinued. The anode control module 28 may maintain the connection with the external circuit while giving priority to itself and the other three control modules 24, 26, 30. The anode control module 28 may terminate the connection to the external circuit if the energy stored at the metal core 42 reaches a critically low level, thus preserving just enough energy to power the control modules 24, 26, 28, 30 for a time until charge functions may be resumed. The temperature control module 26 may also decrease or cease heating at the metal core 42 as appropriate.

A method of making the present invention may include the following. The storage tanks, pumps, directional pressure valves, and electronic control modules may be manufactured according to applicable industry standards. The reaction chamber shell with all appropriate layers may be manufactured as two semi-identical halves. The reaction chamber may also be sufficiently insulated to minimize the energy needed for cooling/heating of the metal core. The metal core may be formed in a mold with the holes at all three geometric axes or formed as a solid shape, then machined to its final state. When the reaction chamber is fully assembled with all necessary components within and without and sufficiently sealed, a gas which may include but is not limited to any noble gas may be used to force all of the oxygen and other gases out of the reaction chamber. Hydrogen gas may then be used to force all of the intermediate gas out of the reaction chamber and applied to an appropriate internal pressure within the reaction chamber. The metal core inside of the reaction chamber may be ionized to a cation (positively charged) state. The remaining components of the battery system may be manufactured, assembled, and added per applicable industry standards.

As a battery system, the present invention is connected to an external circuit to charge or to discharge to do work as described previously. Generally speaking, this design may be used to replace the lithium or other battery systems of gas/electric hybrid or fully electric automobiles. If this system was scaled up, it could be used in larger transportation applications such as electricity storage for trains or eighteen-wheeled trucks. Additionally, this system could be used as electricity storage in stationary applications such as for computer server farms or entire buildings. If coupled with a photovoltaic system or other source, this battery system could serve as electricity storage for remote terrestrial and extra-terrestrial applications such as far removed, land-based monitoring stations or space-based satellites or stations.

The use of technetium in the metal core may also significantly benefit the nuclear power industry. One issue affecting that industry is the problem of waste disposal. Technetium 99 comprises approximately 6.1% of the "waste" produced from the nuclear fission reaction of uranium 235 with slightly better yields from the fission reaction of plutonium 239. In the 11 years from 1983 to 1994, approximately 78 metric tons of technetium 99 was produced in spent nuclear fuel rods. While a small quantity of technetium 99 is presently used in nuclear medicine, the vast majority of such "waste" is simply buried in geologically stable rock. With this in mind, it should be noted that technetium 99 is the third most stable isotope of technetium with a half-life of approximately 211,000 years.

It should be understood, of course, that the foregoing relates to exemplary embodiments of the invention and that modifications may be made without departing from the spirit and scope of the invention as set forth in the following claims.

What is claimed is:

1. A battery comprising:
   a pressurized gas circulating system comprising at least a high pressure storage tank;
   a reaction chamber comprising a housing and a metal core disposed within the housing, wherein the metal core comprises an oxidation state of at least +3;
   a delivery line fluidly connecting the high pressure storage tank to the housing;
   an exhaust line fluidly connecting the housing to the pressurized gas circulating system;
   a cathode terminal, wherein the cathode terminal is a plurality of cathode reflectors disposed within the housing; and
   an anode terminal connected to the metal core, wherein the battery comprises a charging phase when connected to a power source and a discharging phase when connected to an external circuit,
   the charging phase comprising a gas flowing from the high pressure storage tank through the delivery line, wherein the gas is ionized by the cathode terminal with electrons and the ionized gas comes into contact with the metal core, wherein the primary reflectors are positioned to ionize and deflect the gas from the delivery line to the metal core and the secondary reflectors are positioned to ionize and further deflect loose gas molecules to the metal core, and
   the discharging phase comprising the anode terminal delivering the electrons to the external circuit and the gas flowing from the housing into the exhaust line.

2. The battery of claim 1, further comprising a heating element and a cooling element disposed within the housing, wherein the cooling element is activated during the charging phase and the heating element is activated during the discharging phase.

3. The battery of claim 2, further comprising a first valve coupled to the delivery line and a second valve coupled to the exhaust line, wherein the exhaust line comprises a pump.

4. The battery of claim 3, further comprising a control system consisting of a cathode control module operatively connected to the cathode terminal, an anode control module operatively connected to the anode terminal, a pressure control module operatively connected to the first valve and the pump, and a temperature control module operatively connected to the heating and cooling elements.

5. The battery of claim 4, wherein when the power source is electrically connected to the control system, the cathode control module, the cooling element of the temperature control module, and the first valve of the pressure control module are actuated; and when the external circuit is electrically connected to the control system, the anode control module, the heating element of the temperature control module, and the pump of the pressure control module are actuated.

6. The battery of claim 1, further comprising an anode enhancement layer and an insulating layer attached to the metal core with the anode enhancement layer disposed in between the metal core and the anode terminal.

7. The battery of claim 4, wherein the pressurized gas circulating system further comprises:
a first storage tank fluidly connected to the reaction chamber by the exhaust line; and
a second storage tank fluidly connected to the first storage tank by a first auxiliary line and fluidly connected to the high pressure storage tank by a second auxiliary line.

8. The battery of claim 7, wherein each of the exhaust line, the first auxiliary line and the second auxiliary line comprise a pump and at least two directional pressure valves.

9. The battery of claim 8, wherein each of the first storage tank, the second storage tank, the high pressure storage tank, and the housing comprise a pressure sensor in communication with the pressure control module.

10. The battery of claim 9, wherein each of the pumps and the first valve on the delivery line are in communication with the pressure control module.

11. The battery of claim 7, wherein each of the exhaust line, the delivery line, the first auxiliary line, and the second auxiliary line comprise an outer wall and an inner wall, wherein a vacuum is formed therebetween.

12. The battery of claim 11, wherein each of the exhaust line, the delivery line, the first auxiliary line, the second auxiliary line further comprise vented reinforcements connecting the outer wall and the inner wall together.

13. The battery of claim 7, wherein each of the first storage tank, the second storage tank, and the high pressure storage tank comprise an outer wall, a first intermediate wall, a second intermediate wall, and an inner wall, wherein a vacuum is formed in between the outer wall and the first intermediate wall and in between the second intermediate wall and the inner wall.

14. The battery of claim 13, wherein a refrigerant is disposed in between the first intermediate wall and the second intermediate wall.

15. The battery of claim 1, wherein the metal core is perforated.

16. The battery of claim 1, wherein the gas is hydrogen so as to produce a hydride at the metal core to store energy.

17. The battery of claim 1, wherein the gas is a halogen gas comprising at least one of fluorine or chlorine so as to produce a halide at the metal core to store energy.

18. The battery of claim 1, wherein the metal core comprises an alloy.

\* \* \* \* \*